United States Patent [19]

Maezawa et al.

[11] Patent Number: 4,872,167

[45] Date of Patent: Oct. 3, 1989

[54] METHOD FOR DISPLAYING PROGRAM EXECUTING CIRCUMSTANCES AND AN APPARATUS USING THE SAME

[75] Inventors: Hiruyuki Maezawa, Tama; Hidetosi Katumata, Zama; Mikio Tomioka, Kanagawa, all of Japan

[73] Assignees: Hitachi, Ltd.; Hitachi Computer Engineering Co., Ltd., both of Tokyo, Japan

[21] Appl. No.: 282,868

[22] Filed: Dec. 9, 1988

Related U.S. Application Data

[63] Continuation of Ser. No. 33,051, Mar. 30, 1987, abandoned.

[30] Foreign Application Priority Data

Apr. 1, 1986 [JP] Japan .................................. 61-75050
Sep. 20, 1986 [JP] Japan ................................ 61-223332

[51] Int. Cl.$^4$ ............................................. G06F 11/00
[52] U.S. Cl. ..................................... 371/19; 364/200; 371/29.1
[58] Field of Search .......................... 371/19, 16, 29; 564/200, 900

[56] References Cited

U.S. PATENT DOCUMENTS

| | | | |
|---|---|---|---|
| 3,415,981 | 12/1968 | Smith et al. ........................... | 371/19 |
| 3,427,443 | 2/1969 | Apple et al. .......................... | 371/19 |
| 3,522,597 | 8/1970 | Murphy ............................... | 364/200 |
| 4,423,508 | 12/1983 | Shiozaki et al. ....................... | 371/16 |
| 4,434,489 | 2/1984 | Blyth .................................... | 371/29 |
| 4,571,677 | 2/1986 | Hirayama et al. .................. | 364/200 |

FOREIGN PATENT DOCUMENTS 57-14954 1/1982 Japan .
59-105145 6/1984 Japan .
59-186054 10/1984 Japan .

*Primary Examiner*—Charles E. Atkinson
*Attorney, Agent, or Firm*—Fay, Sharpe, Beall, Fagan, Minnich & McKee

[57] ABSTRACT

Each program element of a desired program is converted into a corresponding graphic element and is displayed on a screen of a display, which enables a schema of the program to be visually displayed as graphics on the screen of the display. When the program is executed, the graphic elements corresponding to the program elements of the program under execution and a graphic element corresponding to a program element under execution are displayed on the screen of the display in a visually discriminated fashion. When necessary, the execution count of each program element is displayed in the neighborhood of the program element on the screen of the display. Or, according to the execution count of each program element, the color of the displayed graphic element of the program element is changed on the screen of the display.

31 Claims, 17 Drawing Sheets

FIG. 2

| LINE NO. | PROGRAM |
|---|---|
| 01 | A = X; |
| 02 | B = Y; |
| 03 | DO I = 1 TO 3 |
| 04 | B = B * I; |
| 05 | END; |
| 06 | IF A > B |
| 07 | THEN DO; |
| 08 | C = A + B; |
| 09 | DO I = 1 TO 10; |
| 10 | C = C * I; |
| 11 | END; |
| 12 | END; |
| 13 | ELSE DO; |
| 14 | C = A - B; |
| 15 | DO CASE C; |
| 16 | C = 0 : C = C / 2; |
| 17 | C = 1 : C = C / 3; |
| 18 | C = 2 : DO; |
| 19 | C = C / 4; |
| 20 | DO I = 1 TO 10; |
| 21 | C = C * I; |
| 22 | END; |
| 23 | IF C > 1000 |
| 24 | THEN C = C / 1000, |
| 25 | END; |
| 26 | END; |
| 27 | END; |
| 28 | ANS = C; |

FIG. 4

| BOX NO. | EXECUTING CIRCUMSTANCE |
|---|---|
| 35 | 1 |
| 36 | 0 |
| 37 | 0 |
| 38 | 0 |
| 39 | 0 |
| 40 | 0 |
| 41 | 0 |
| 42 | 0 |
| 43 | 0 |
| 51 | 0 |
| 52 | 0 |

FIG. 15

| PROGRAM ELEMENT | PAD | FLOWCHART | |
|---|---|---|---|
| CONNECTIVE STATEMENT (EXAMPLE)<br><br>A = X ; | A = X | A = X | 73 |
| ITERATION (EXAMPLE)<br><br>Do I = 1 TO 3 ;<br>▨<br>END | I=1 TO 3 — ▨ | I = 1<br>▨<br>I = I + 1<br>I > 3 | 74 |
| JUDGEMENT (EXAMPLE)<br><br>IF A > B<br>  THEN ▨<br>  ELSE ▨ | A>B ▨<br>▨ | NO ← A>B → YES<br>▨ ▨ | 75 |
| DO CASE STATEMENT (EXAMPLE)<br><br>DO CASE A<br>  A = 0: ▨<br>  A = 1: ▨<br>  A = 2: ▨ | A = 1 =0 ▨<br>=2 ▨<br>▨ | 0   A =   2<br>    1<br>▨ ▨ ▨ | 76 |

METHOD FOR DISPLAYING PROGRAM EXECUTING CIRCUMSTANCES AND AN APPARATUS USING THE SAME

This is a continuation of co-pending application Ser. No. 033,051 filed on Mar. 30, 1987, now abandoned.

BACKGROUND OF THE INVENTION

The present invention relates to a support system for supporting by a computer the development and test of a computer program, and in particular, to a method for displaying program executing circumstances and an apparatus using the same suitable for a case where a path of execution and a position of execution of a program are confirmed in a visual display format.

Conventionally, as demands for software and the like are increased, the development of a computer program and the test of the program become to be achieved by use of a support system such as a computer. This is because most programs among the computer programs once generated need modifications before the programs are used and the programs generated by a computer are required to be tested to confirm whether or not the program can be normally executed. When testing such a program, break points are set to the program so as to halt the program after the program portion up to a break point is executed. Pertinent data is then checked to determine whether or not the path includes an abnormality.

Different from this operation, there has been a system (ANIMATER) which displays the source program on a screen (CRT) of an interactive terminal to indicate operations of the source code (source program) by use of the cusor (refer to the Hitachi T-560/20 Video Data System, Personal Station Program Product Level II COBOL Operation Manual, pp. 63-68 for details).

Moreover, the JP-A-178554 describes an example of the debug information collection in a program test.

In the prior art method, since the path of program execution is not sufficiently obtained in a visual format, the operation in a program can only be checked depending on the numeric values of data, which leads to a program that whether or not the program is completely reliable cannot be externally judged. Moreover, also in the other method described above, there exists also a problem that the path once executed cannot be visually inspected by use of a display.

SUMMARY OF THE INVENTION

It is therefore an object of the present invention to provide a method for displaying the program executing circumstances in a case where a program test is conducted, for example, in a program development so as to enable to visually obtain the program executing circumstances in the realtime fashion and to enable the overall program flow and an abnormality of a path to be easily recognized through a visual check, thereby solving the prior art problems.

To solve these problems, according to the present invention, an information processing system including a computer and an interactive terminal is provided with means for displaying a path of a program execution and means for displaying a positions of a program element under execution; furthermore, there are included means for displaying an execution count of a program element (for example, an execution statement), means for representing a program schema in graphics and for displaying in the represented graphics the path of a program execution, means for indicating a position under execution, and means for displaying an execution count of each execution statement.

For the visual understanding to facilitate understanding, during an execution of a program test, the circumstances including (1) under execution, (2) after execution, (3) before execution, and (4) execution count of program element are respectively saved for each program element (equivalent to a statement in a high level language structure) constituting the program. When an execution proceeds to the next program element, the information saved in a table are updated; furthermore, based on the saved information, the graphic elements (e.g. blocks) corresponding to the program elements are displayed in the different colors on the screen of the interactive terminal, thereby effecting a realtime display of executing circumstances of the blocks in the interactive screen.

According to an aspect of the present invention, there is provided a method for displaying executing circumstances of a program comprising the steps of storing in store means a desired program constituted from a plurality of program elements, reading the program from the store means and converting each program element thereof into a graphic element corresponding to said each program element, thereby displaying a schema of the program on a display in graphics, executing the program, monitoring the executing circumstances of the program, and classifying into a plurality kinds of executing circumstances each program element in a path of execution of the program and displaying according to the classification of the executing circumstances the graphic elements corresponding to said program elements in a visually discriminated fashion.

According to another aspect of the present invention, there is provided a method for displaying executing circumstances of a program comprising steps of storing in store means a desired program constituted from a plurality of program elements, reading the program from the store means and converting each program element into a graphic element corresponding to said each element, thereby displaying a schema of the program on a display in graphics, executing the program, counting an execution count for each program element of the program under execution, and according to a result of the execution count of each program element, displaying on the display graphic elements corresponding to said program elements with different colors.

According to another aspect of the present invention there is provided an apparatus for displaying executing circumstances of a program comprising means for storing a desired program constituted from a plurality of program elements, means connected to said store means for reading the program from said store means and for converting each program element thereof into a graphic element corresponding to said each program element, thereby converting a schema of the program into graphics, display means connected to said converting means for displaying the converted graphics representing the schema of the program, means connected to said store means for executing the program, means connected to said program execute means for monitoring the executing circumstances of the program, and means connected to said convert means, said display means, and said monitor means for classifying into a plurality of execution circumstances each program element in a path of execution of the program and for displaying on said display means according to the classification of the execution circumstances the graphic elements corresponding to said program elements in a visually discriminated fashion.

BRIEF DESCRIPTION OF THE DRAWINGS

The present invention will be apparent from the following detailed description taken in conjunction with the accompanying drawings in which:

FIG. 2 is a diagram showing an example of a program saved in a program store unit;

FIG. 4 is a diagram showing an example of a structure of the executing circumstance saving table of the executing circumstance control unit of FIG. 1;

FIG. 15 is a schematic diagram showing a table of correspondences between program elements, PAD, and flowchart;

DESCRIPTION OF THE PREFERRED EMBODIMENTS

An embodiment of the present invention will be described in more detail with reference to the accompanying drawings.

The following description of the embodiment will be given on assumption that the present invention is applied to an information processing system including a computer and an interactive terminal. The description of the overall structure diagram of the information system will be omitted and the functional structure characteristic to the present invention will be described.

Figure 1:
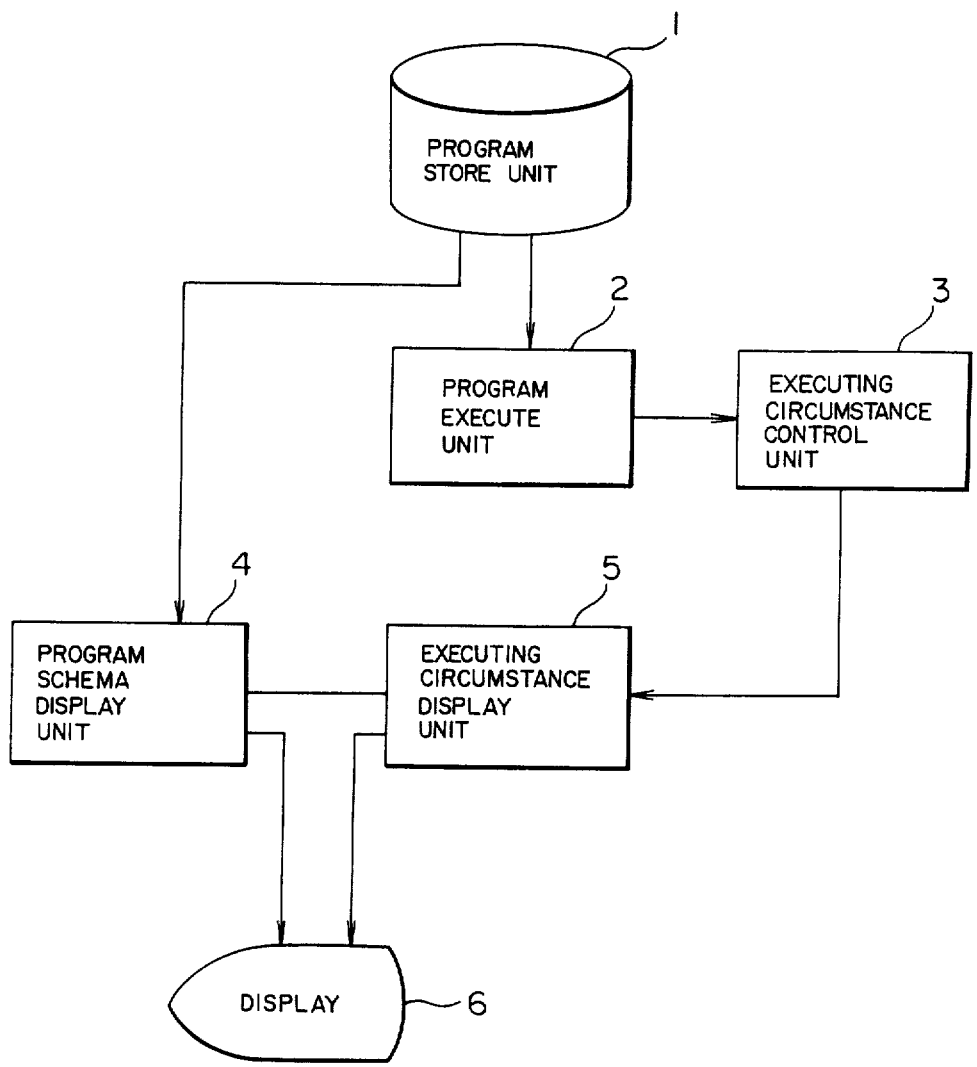
FIG. 1 in a functional structure diagram of functions incorporated in an information processing system as an embodiment of the present invention.

FIG. 1 is a structure diagram of functions constituting the information processing system as an embodiment of the present invention. The information processing system includes an interactive terminal and hence the operator can develop a program (e.g. a program test, a program debug, or a program review) through an interactive operation by checking messages and the program displayed on the screen of the interactive terminal.

Figure 3:
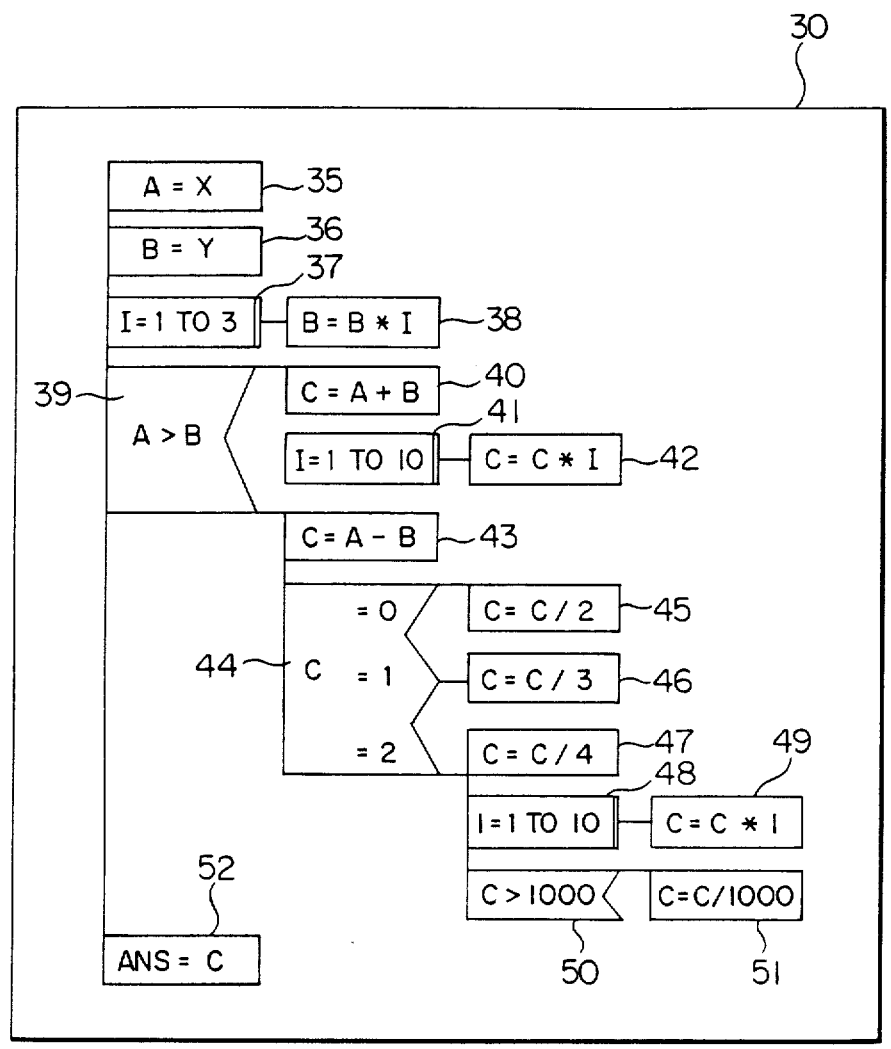
FIG. 3 is a schematic diagram illustrating an example of a screen display of the structure of FIG. 2 by use of PAD in the program schema display unit of FIG. 1.

The system of FIG. 1 includes a program storage unit 1 which stores programs and from which programs are fetched when necessary and a program execute unit 2 for sequentially executing the program elements constituting the program fetched from the program storage unit 1. Reference numeral 3 is an execution circumstance control unit for storing the execution circumstance information for each program elements, namely, this unit 3 monitors an execution of a program and updates the information of a program element executed by the program execute unit 2. Reference numeral 4 is a program schema display unit for displaying on a screen the schema of a program fetched from the program store unit 1. Reference numeral 5 indicates an execution circumstance display unit for displaying according to the execution circumstance information stored in the execution circumstance control unit 3 whether or not an execution is finished for each program element displayed on the screen by the program schema display with 4. Reference numeral 6 is a display for visually displaying a program as shown in FIG. 2 (to be described later) in a representation format of PAD as shown in FIG. 3 (to be described later).

FIG. 2 is a diagram illustrating an example of a portion of a program stored in the program storage unit 1 of FIG. 1. This example is written by use of the known language, PL/M86 and comprises program elements in line nos. 01-28.

Each unit of FIG. 1 will be described in detail with reference to an example of a program shown in FIG. 2.

The program store unit 1 fetches the stored program of FIG. 2 and supplies the program to the program execute unit 2 and the program schema display unit 4, which in turn displays the schema of the program on the screen of the display 6.

FIG. 3 is an example in which the schema of the program of FIG. 2 is displayed on the screen. In FIG. 3, as a form for displaying a schema of a program, the known Problem Analysis Diagram (PAD) form is adopted to display the schama. A method for converting the program of FIG. 2 into the PAD form for display can be implemented, for example, by use of a method described in the specification of the Japanese patent application No. 60-228682 filed by the inventors of the present invention. Here, reference numeral 30 indicates a screen of the display 6 and the graphic elements, namely, boxes 35-52 respectively correspond to the program elements in the line nos. 01-28 of FIG. 2. For example, the boxes 35 and 37 correspond to the program elements in the line nos. 01 and 03, respectively.

On the other hand, the program execute unit 2 receives the program from the program store unit 1 and sequentially executes the program elements with the line nos. 01–28 beginning from the top thereof. In the example of FIG. 2, since the line no. 01 appears at the top of the program, the program element of the line no. 01 is first executed. When the execution is completed, the condition is notified to the executing circumstance control unit 3. On receiving the notification, the executing circumstance control unit 3 saves corresponding to each program element of FIG. 2 an information indicating whether or not the program element has been executed.

FIG. 4 is a diagram showing an example of the structure of the executing circumstance save table of the executing circumstance control unit 3. This table is disposed to save an information indicating whether or not a program element has been executed.

Figure 5:
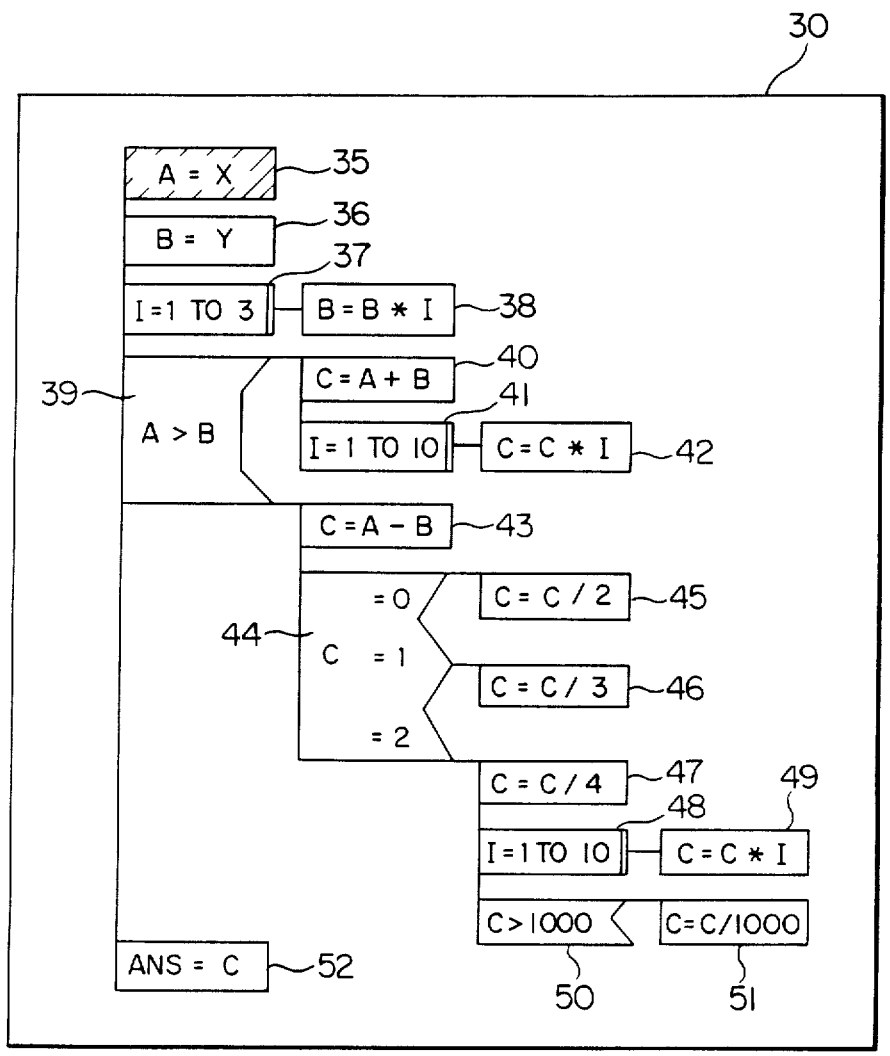
FIG. 5 is a schematic diagram illustrating an example of the screen when a program is under execution.

In FIG. 4, the executing circumstance save table includes a field 41 for storing a number assigned to a box shown in FIG. 3 and an executing circumstance field 42. A storage area is provided for each program element and the table is configured such that when the numeric value is 1 or 0 in the storage area, it is indicated that the program element has been executed or not. Before the program is executed, the areas for the program elements are set to 0's indicating that the program elements have not been executed. When the program execute unit 2 attempts an execution of the program element of the line no. 01 and the execution is completed, an information that the execution of the program element is completed is notified to the executing circumstance control unit 3. On receiving this notification, the executing circumstance control unit 3 stores "1" indicating the completion of the execution in an area corresponding to the program element of the line no. 01, namely, the graphic element thereof. That is, a value of 1 is stored in the area corresponding to the box 35. Next, the executing circumstance display unit 5 receives from the executing circumstance control unit 3 the executing circumstance information of each program element of the program and the display position of the program element displayed on the screen 30 of the display 6 and then displays for each executed program element the pertinent indication for the corresponding element on the screen 30. As a display form for indicating the completion of the execution, FIG. 5 shows a method using inclined lines or slants. Furthermore, as such a display form, a method for indicating the completion of the execution with a different color may also be adopted. The description will now be given with reference to an example using slants as shown in FIG. 5.

Subsequently, the program elements of the line no. 02 and subsequent line numbers are sequentially executed, and the executing circumstance control unit 3 accordingly updates the executing circumstance information in the executing circumstance save table of FIG. 4. Based on the contents of the executing circumstance save table, the executing circumstance display unit 5 discriminately displays the executed program elements on the screen 30, which realizes the realtime display of the program executing circumstances.

Figure 6:
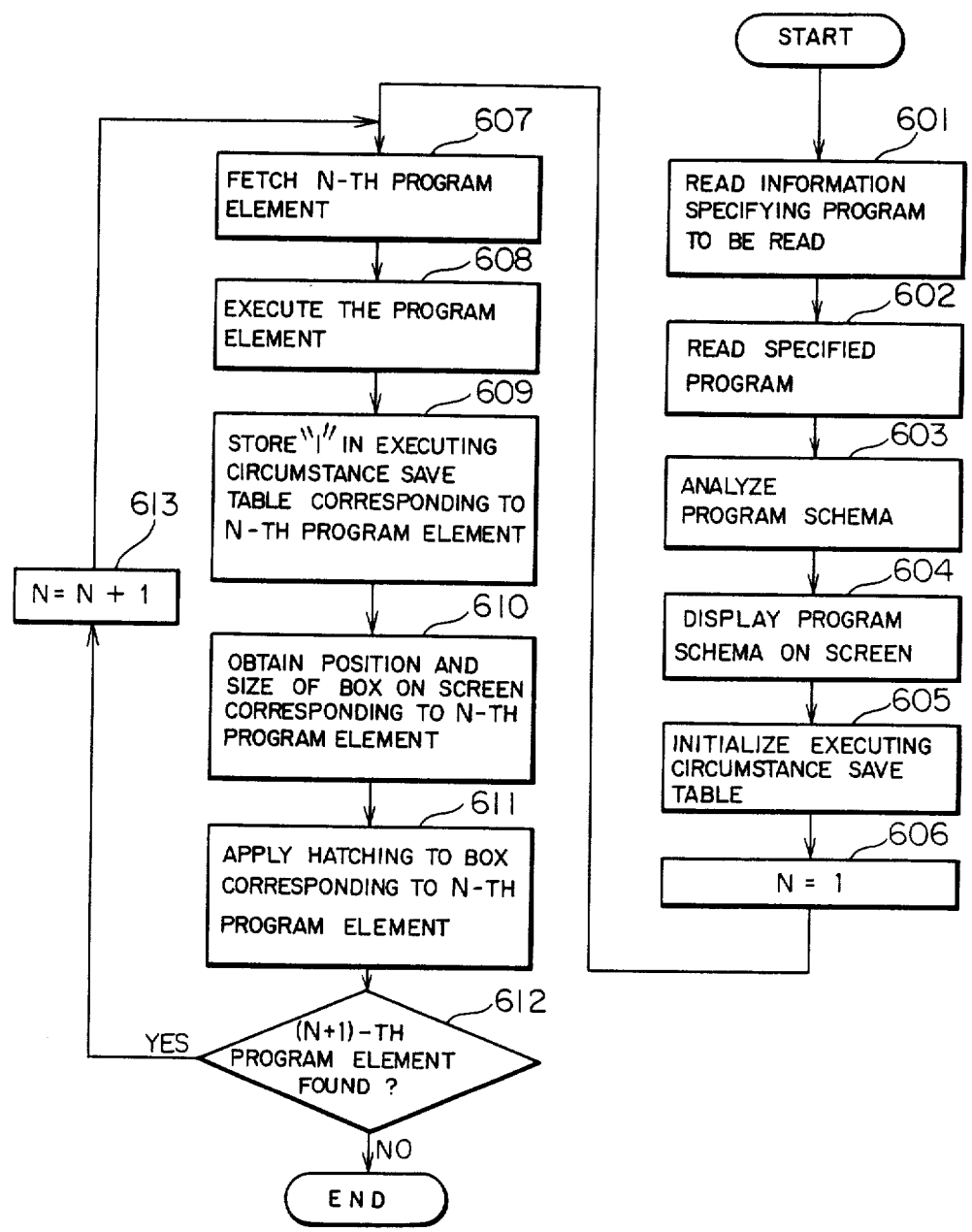
FIG. 6 is an operation flowchart of the program executing circumstance display processing to be achieved by the units of FIG. 1.

FIG. 6 is an operation flowchart of the program executing circumstance display processing effected by the units of FIG. 1. The subsequent description will be given according to FIG. 6.

First, an information specifying a program to be executed is read by use of the program storage unit 1 (step 601), and then the specified program is read (step 602). The structure or schema of the program thus read is analyzed by the program schema display unit 4 (step 603) and the schema of the analyzed program is displayed on the screen 30 of the display 6 (step 604). Before the obtained program is executed in the program execution unit 2, the executing circumstance save table is initialized by the executing circumstance control unit 3 (step 605). Next, the program execute unit 2 assigns 1 as the line number N to fetch the first program element (steps 606–607), and then the fetched program element is executed (step 608). After the execution, the executing circumstance control unit 3 stores "1" in the executing circumstance save table corresponding to the 1st program element (step 609). After the value of 1 is stored, the executing circumstance display unit 5 obtains the position and the size of a box on the screen corresponding to the N-th element (step 610) and applies hatching to the box corresponding to the 1st program element (step 611). Refer to FIG. 5 for details about the screen 30 to which hatching has been applied. The program execute unit 2 effects a check to determine whether or not the next program element exists (step 612) and finishes the processing if the next program element is missing; otherwise, one is added to the line no. N (step 613) and control returns to the step 607.

In the embodiment, the path of program execution is displayed; however, the program element currently being executed is not displayed. To display the program element, the units of FIG. 1 are to be expanded as follows.

First, in addition to the function to supply the executing circumstance control unit 3 with the information items of "before execution" and "after execution", a function to supply thereto an information item of "under execution" is added to the program execute unit 2. Secondly, the executing circumstance control unit 3 is provided with a function to store information indicating the "under execution" in addition to the function to store the information items of "before execution" and "after execution" for each program element. To this end, for example, in the table of FIG. 4, "2 (under execution)" is stored in addition to "0 (before execution)" and "1 (after execution)". At a point of time when the program execute unit 2 supplies the executing circumstance control unit 3 with an information indicating that an element is under execution, the executing circumstance control unit 3 writes "2" in a location of the table of FIG. 4 corresponding to the element. Next, at a point of time when the program execute unit 2 supplies the executing circumstance control unit 3 with an information indicating that another element is under execution, the executing circumstance control unit 3 writes "1" in the location containing "2" and then writes "2" in a location correspondng to said another element.

Thirdly, the executing circumstance display unit 5 is provided with a function to display the state of "under execution" in addition to the function to display the states of "before execution" and "after execution" for each program element displayed on the screen by the program schema display unit 4 according to the executing circumstance information saved in the executing circumstance control unit 3.

Figure 7:
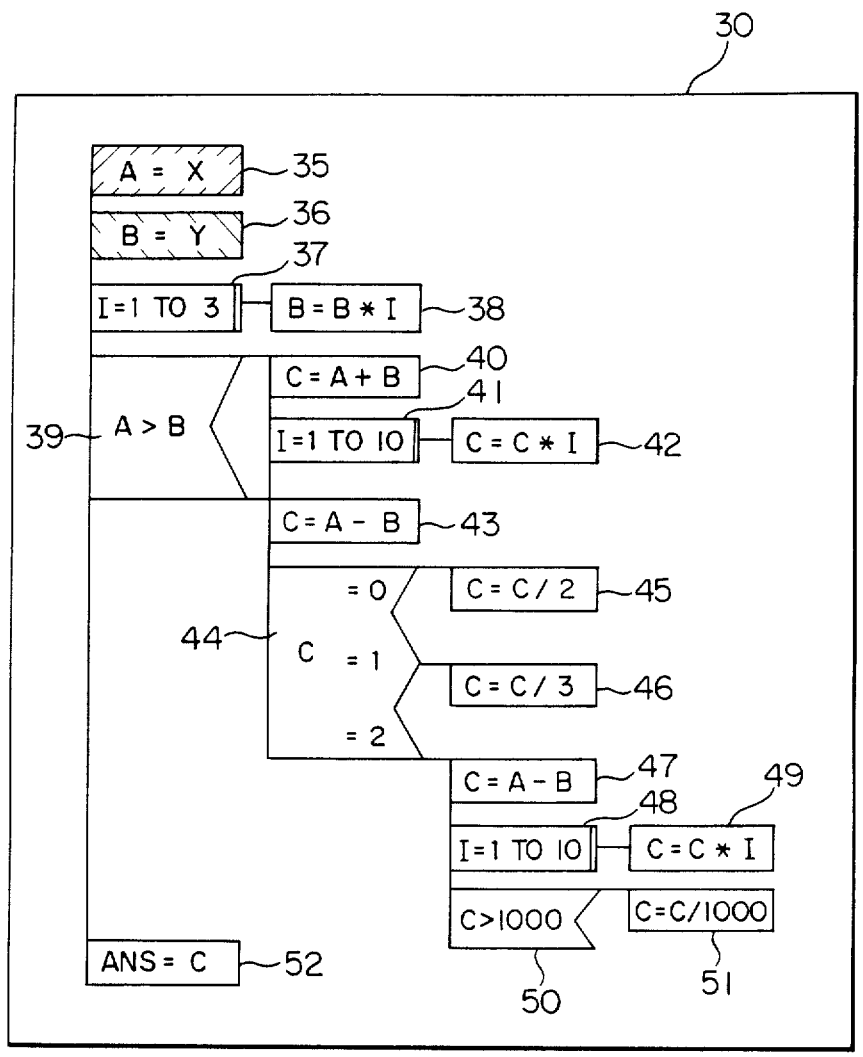
FIG. 7 is a schematic diagram illustrating an example of the screen when the program is executed by adding a function to display the position under execution.

FIG. 7 is a diagram showing an example of the screen 30 at a point of time when the program element of the line no. 2 is currently being executed after the completion of the execution of the program element of the line no. 01. Among various display forms of each executing circumstance, this diagram shows an example in which the element after execution and the element under execution are marked with inclined lines from the upper right corner to the lower left corner and vice versa, respectively. As another example of the display form, there may be used a method in which the element after execution and the element under execution are identified by use of a monochrome display and a colored display.

Figure 8:
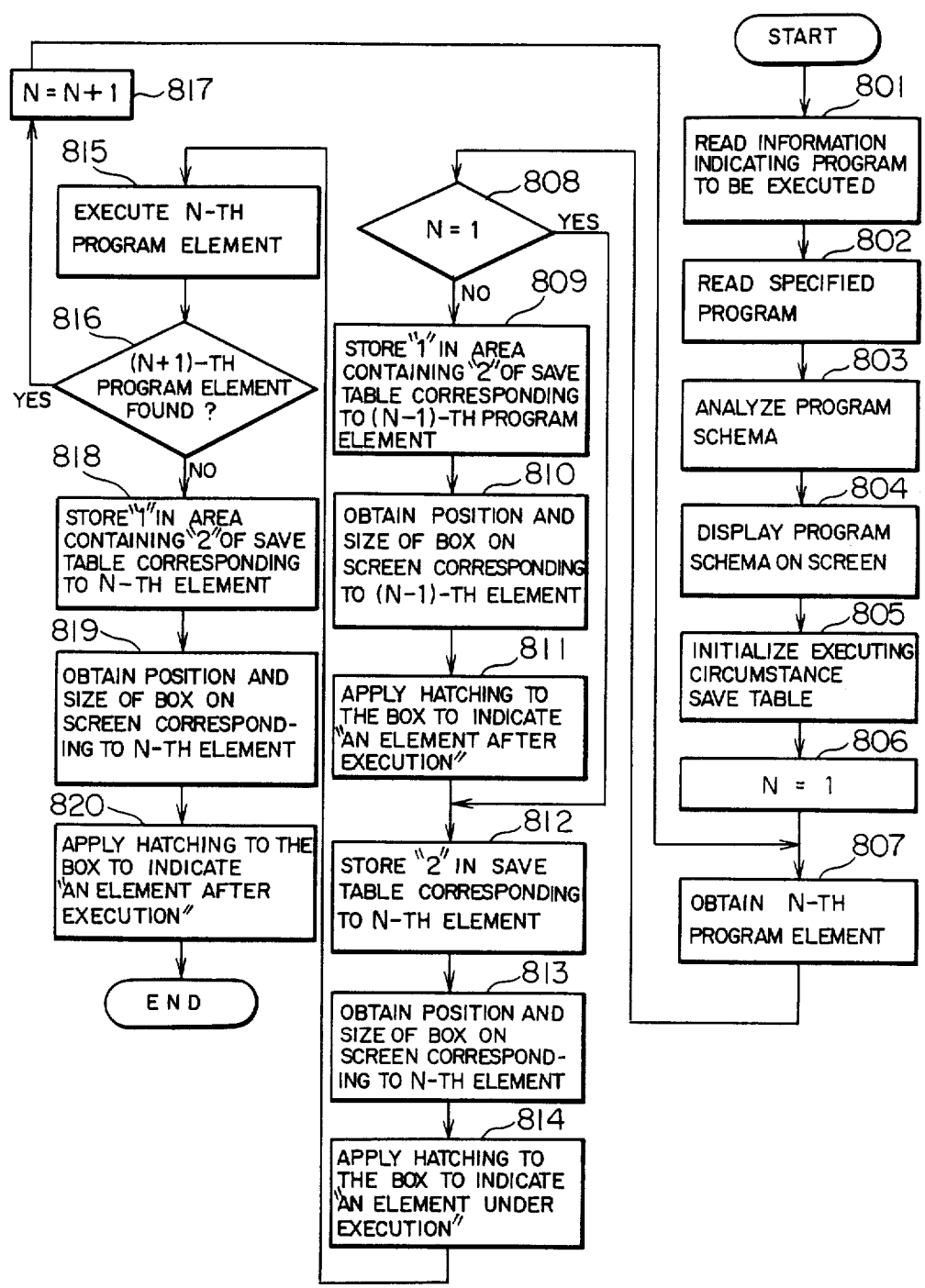
FIG. 8 is an operation flowchart of the program executing circumstance display processing when a function to display the position under execution is added to the functions of FIG. 1.

FIG. 8 is an operation flowchart of the program executing circumstance display processing when the functions above are added to the units of FIG. 1. The description will be now described with reference to FIG. 8.

First, an information specifying a program to be executed is read by use of the program storage unit 1 (step 801) and then specified program is read (step 802). Next, the program schema display unit 4 analyzes the schema of the fetched program (step 803) and the schema of the analyzed program is displayed on the screen 30 of the display 6 (step 804). Before the fetched program is executed by the program execution unit 2, the executing circumstance control unit 3 initializes the executing circumstance save table of FIG. 4 (step 805). Next, the program execution unit 2 assigns "1" to the line no. N and fetches the first program element (steps 806–807). The program execute unit 2 having the added function compares the fetched line no. N with that of the program element under execution to determine whether or not the line no. N matches with the line number (step 808). If the line numbers match with each other, control proceeds to the step 812; otherwise, the executing circumstance control unit 3 writes "1" in a location containing "2" in the executing circumstance save table corresponding to the program element of the line no. N-1 (step 809). Next, the execution circumstance display unit 5 obtains the position and the size of the box on the screen 30 corresponding to the (N-1)-th element (step 810) and then applies hatching to the obtained box to indicate the state after execution (step 811). The executing circumstance control unit 3 then stores "2" in the executing circumstance save table corresponding to the element of the line no. N (step 812) and notifies the information to the executing circumstance display unit 5. On receiving the notification, the executing circumstance display unit 5 obtains the position and the size of the box on the screen 30 corresponding to the element of the line no. N (step 813) and then applies hatching to the attained box to indicate the state under execution (step 814). Refer now to FIG. 7 for details about an example of the hatching operations associated with the steps 811 and 813.

Next, the program execute unit 2 executes the N-th program element (step 815). And then a check is effected to determine whether or not the next program element exists (step 816). If the next program element is found, one is added to the line no. N (step 817) and control returns to the step 807; otherwise, the executing circumstance control unit 3 writes "1" in a location containing "2" of the executing circumstance save table corresponding to the N-th element (step 818) and notifies the information to the program circumstance display unit 5. On receiving this notification, the executing circumstance display unit 5 attains the position and the size of the box on the screen 30 (FIG. 7) corresponding to the N-th element (step 819) and applies hatching to the attained box to indicate the state after execution (step 820).

In some cases, the overall flow will be more comprehensible if the execution count is displayed on the screen in addition to the execution circumstances such as the state under execution, the state after execution, and the state before execution. For this purpose, the following functions are added to the units of FIG. 1. As the first addition of function, a function to save the execution count of each program element is added to the executing circumstance control unit 3.

Figure 9:
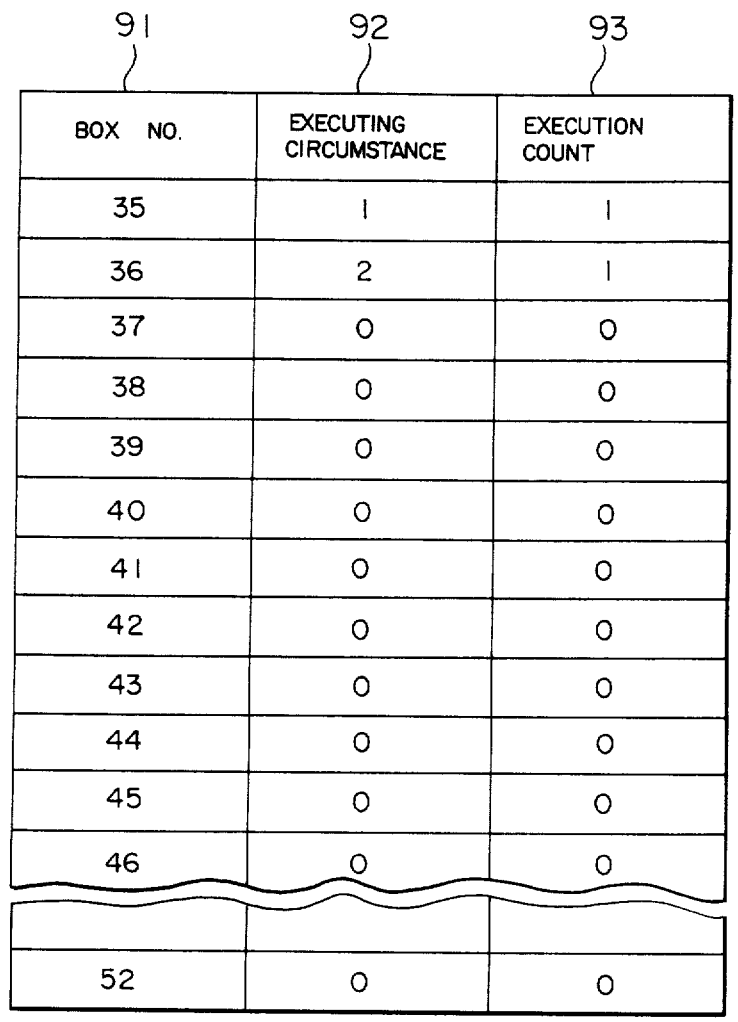
FIG. 9 is a schematic diagram of an example of the storage structure when the function to save the execution count is added.

FIG. 9 is a diagram showing an example resulted from an expansion of the storage structure of FIG. 4 to save the execution count. This executing circumstance save table includes a box no. field 91, an executing circumstance field 92, and an execution count field 93.

The executing circumstance control unit 3 set "0" to an area of the execution count field 93 at the start of a program and each time the program execute unit 2 supplies thereto an information indicating that an element is under execution, the executing circumstance control unit 3 effects a count-up operation to add "1" to the integer value stored in the save area of the execution count field 93.

As the second addition of function, the executing circumstance display unit 5 is further provided with a function to receive an information of the execution count and an information of a position on the screen 30 where the execution count is to be displayed from the executing circumstance control unit 3 and to display the execution count on the screen 30 based on the received information items.

Figure 10:
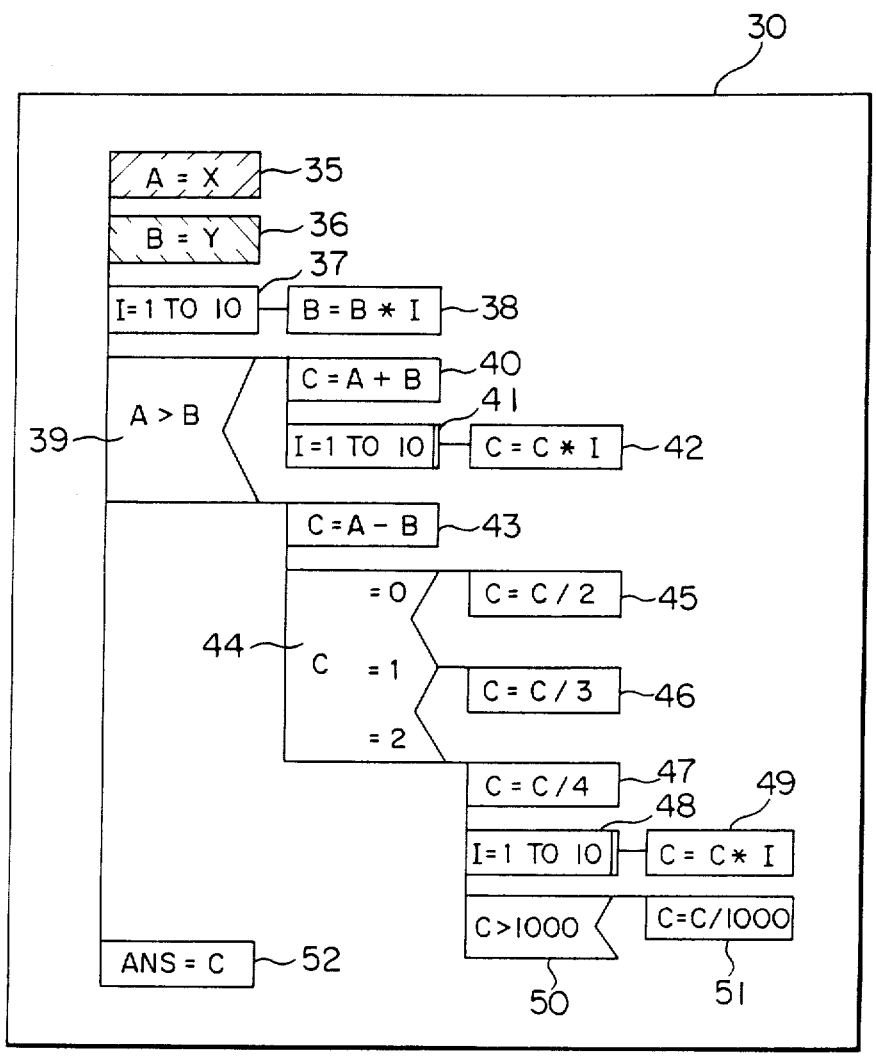
FIG. 10 is a diagram showing an example of the screen when the program is executed with the function to display the execution count.

FIG. 10 is a diagram showing an example of the screen 30 in which the execution count is displayed as a result of the addition of the functions above. In this diagram, the inclined lines from the upper right corner to the lower left corner indicate that the box contains a program element after execution, whereas the inclined lines from the upper left corner to the lower right corner indicate that the box contains a program under execution. In addition, the digits marked at the upper right position to the boxes 35–36 indicate that the program elements contained in the boxes 35–36 have been once executed.

Figure 11:
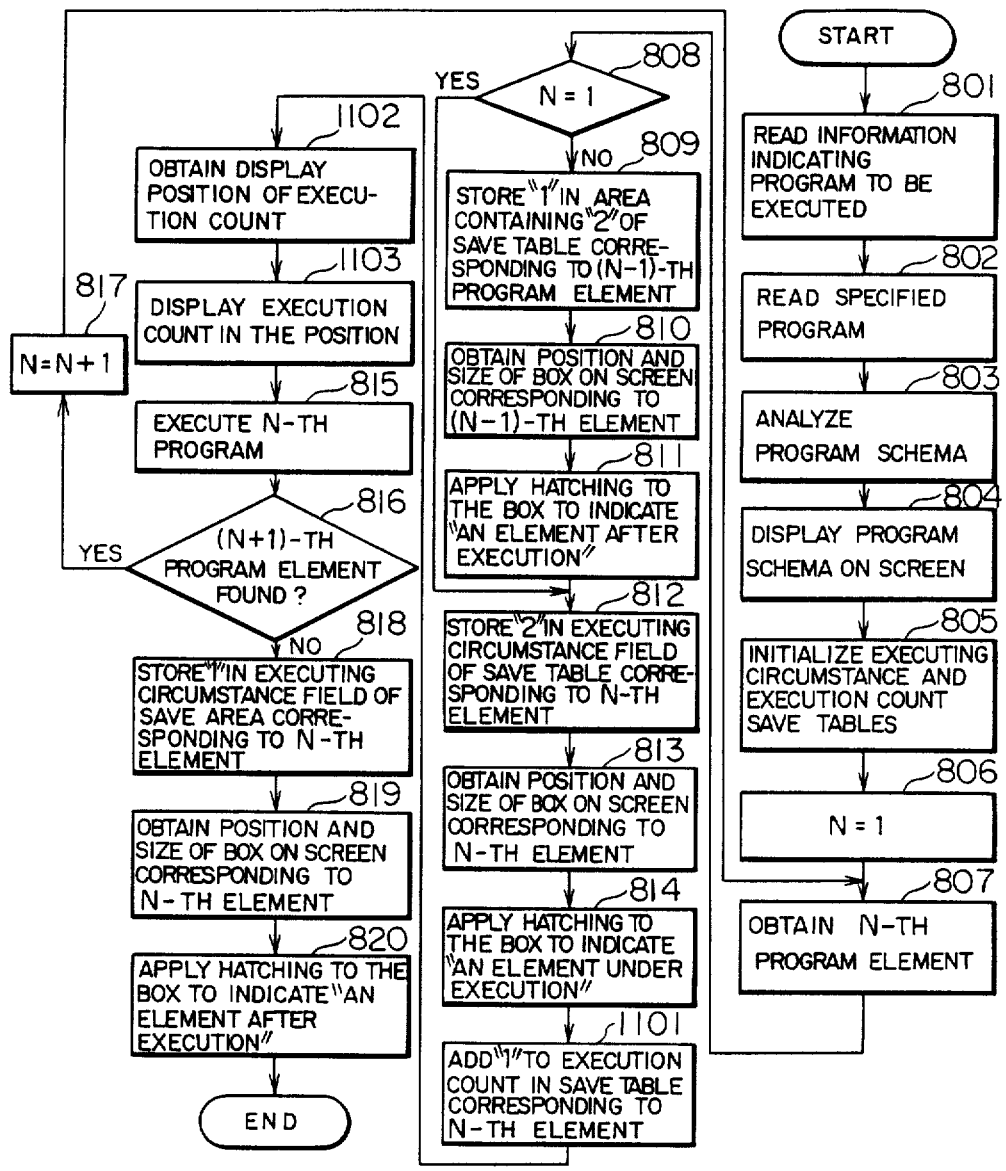
FIG. 11 is a flowchart of the program executing circumstance display processing when the function display the execution count is added to the functions of FIG. 1.

FIG. 11 is a flowchart of operations in the program executing circumstance display processing when the function of the 3rd embodiment is added to the units of FIG. 1. The subsequent description will be given with reference to FIG. 11.

Since the operation flowchart of FIG. 11 is generated by adding the processing to display the execution count to a location between the steps 814 and 815 of the flowchart of FIG. 8, only the processing operations of the added function will be here described. Namely, after the step 814 is processed, the executing circumstance control unit 3 with the added function adds "1" to the execution count in the save table (FIG. 9) corresponding to the N-th element and notifies this information to the executing circumstance display unit 5 (step 1101). On receiving this notification, the executing circumstance display unit 5 having the added function obtains the display position of the execution count (step 1102) and then displays the execution count at the obtained position on the screen 30 (FIG. 10) (step 1103). Thereafter, the step 815 and subsequent steps are achieved as described above.

Next, FIGS. 12a–14 show an embodiment in which when a program is tested by displaying the program in a diagram specification identical to that of a source program, each box is displayed by the unique color according to the frequency of the passages of control through the box.

During an execution of a program with test items set thereto, the number of executions is counted for each box. After the test is finished, the boxes are classified with different colors depending on the count values. For example, the boxes are relatively discriminated from the lowest frequency to the highest frequency by use of a color spectrum ranging from a cold color to a warm color. This enables to visually recognize the boxes checked by the test and those not checked.

The embodiment will be described with reference to the diagrams in detail.

Figure 12A:
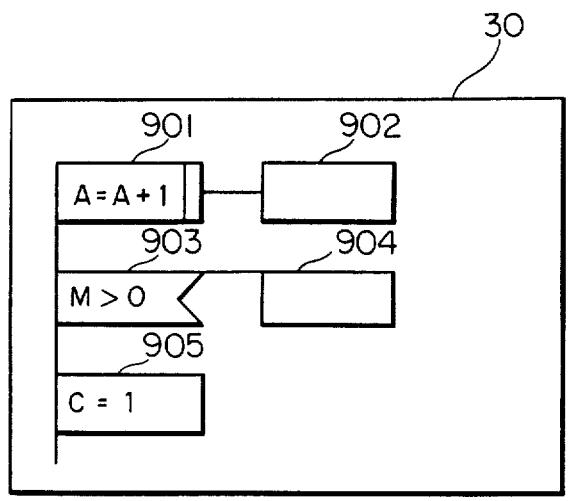
FIGS. 12a-12b are schematic diagrams showing an example of a screen display of the program schema by use of PAD in another example of the present invention.
Figure 12B:
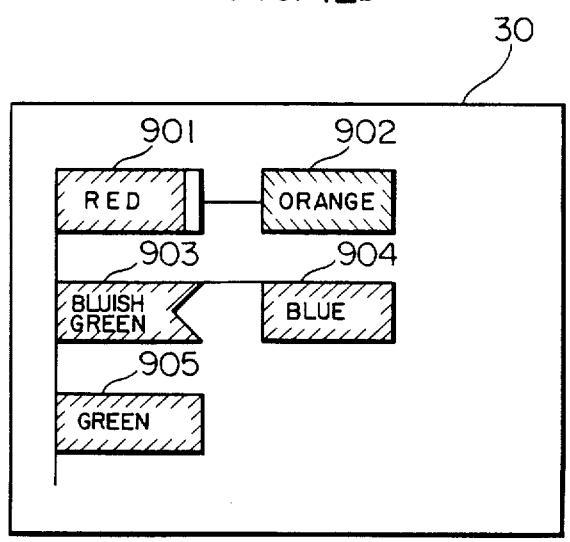

FIGS. 12a-12b show display examples in the display according to the present invention. FIG. 12a is a display example before the test in which boxes 901-905 are equivalent to the source program. As a result of the test on the source program, the boxes are discriminately colored as shown in FIG. 12b. It is assumed here that the execution counts of the boxes, namely, the frequencies are relatively increased in a direction from a cold color to a warm color. FIG. 12b shows that a box of a warm color, particularly, the box 901 colored in red has been executed with a sufficiently high frequency, whereas the box 904 colored in blue of a cold color has been executed with a lower frequency.

Figure 13:
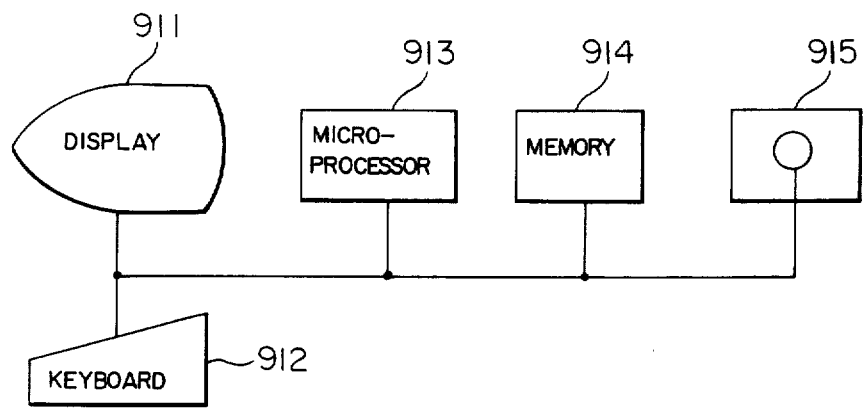
FIG. 13 is a schematic diagram illustrating the system structure of the embodiment of FIGS. 12a-12b.

The program generation and test are conducted by use of the system configuration as shown in FIG. 13. Namely, the program is interactively generated by visually checking the screen of the display 911 through the key operation from the keyboard 912 and then a PAD of FIG. 12a is displayed on the display 911. The PAD is converted into a corresponding program source, which is then translated by a compiler into a machine language to be executed by the microprocessor 913. Before the test of the PAD, a storage area is allocated in the memory 914 for each box number of the PAD.

Figure 14:
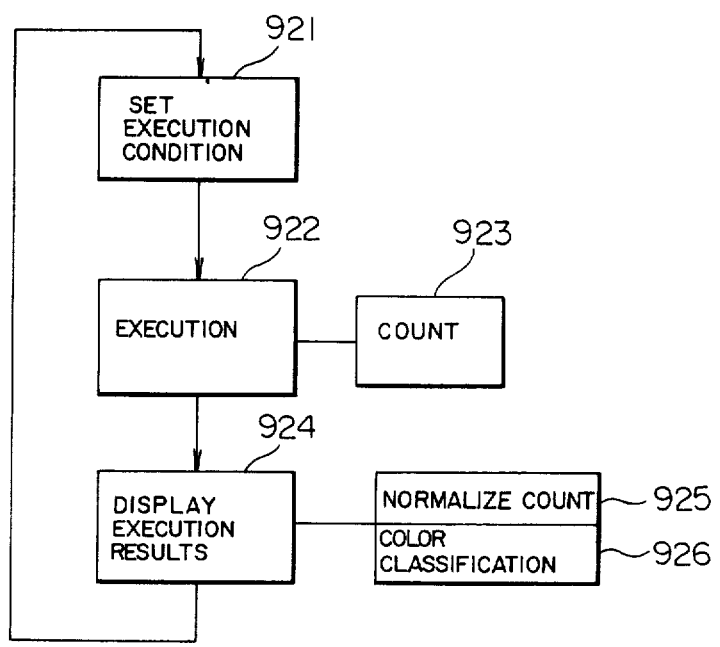
FIG. 14 is an operation flowchart of the program executing circumstance display processing to obtain the graphic display of FIG. 12b.

FIG. 14 is a flowchart of the program test. First, the execution condition for starting the test is set from the keyboard 912 (step 921). The execution condition includes information such as box numbers and the range of boxes in the PAD to be tested and initial values of variables in the test objective PAD (for example, A=0 for the box 901). Thereafter, the PAD being displayed in the display 911 is executed (step 922). In this operation, for each execution of a box, "1" is added to the content of a storage area in the memory 914 corresponding to the box number (step 923). Namely, the storage areas in the memory 914 corresponding to the box numbers are loaded with the respective operation counts of the boxes in the PAD. When the specified number of executions are completed, the results of the execution are displayed on the display (step 924). In this processing, the operation count of each box is divided by the sum of the operation counts of all boxes to obtain a ratio. Namely, the count value is normalized (step 925). Next, according to the count values thus normalized, the boxes being displayed in the chart of PAD in the display 911 are colored in which a warm color such as red is applied to a box having a large count value, whereas a cold color is applied to a box having a small count value (step 926). More concretely, the colors are assigned, for example, in the descending order of count values as red (100%-85%), orange (85%-70%), yellow (70%-55%), green (55%-40%), blue (40%-25%), indigo blue (25%-10%), and violet (10%-0%).

The program for which the test is completed is stored on a floppy disk 915.

As described above, according to the embodiment shown in FIGS. 12a-14, when testing a program by displaying the program in the diagram form (box) identical to the source program, the boxes are discriminately colored according to the frequencies of passages of control through the respective boxes; consequently, the test results can be visually recognized. For example, by repetitiously conducting the test until all boxes are entirely colored with desired colors (for example, warm colors), a program failure which may occur if the test is not effected with respect to the failure (a latent bug) can be beforehand avoided.

The description above has been given of an example in which the program schema is displayed in the PAD representation format; however, the flowchart may also be adopted as the display form of the program schema. The difference between the methods using the flowchart and the PAD as the display form of the program schema is as follows.

Namely, the program schema display unit 4 displays a flowchart in the screen for the schema of the program supplied from the program store unit 1.

By expanding the functions of the units of FIG. 1 as follows according to the difference, the present invention becomes to be applicable.

FIG. 15 is a diagram showing a table of correspondence between each program element, the PAD, and the flowchart. The program schema display unit 4 is supplied with a function to convert the PAD into a flowchart according to the correspondences of FIG. 15. The conversion of a connective statement from the PAD into the flowchart is achieved according to the rule 73. Moreover, the rules 74-76 similarly apply to the cases of an iteration, a judgment, and a DO CASE statement, respectively.

Figure 16:
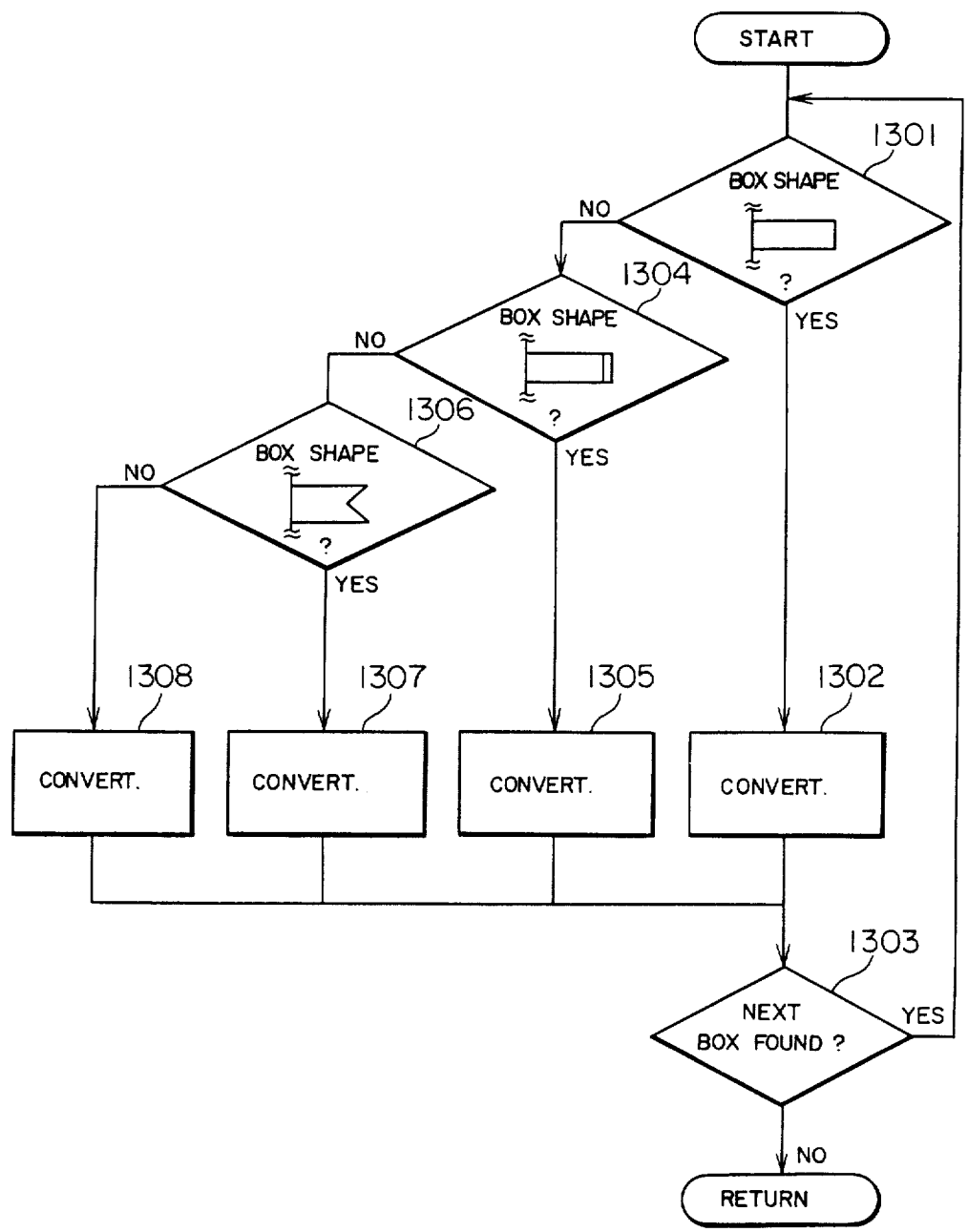
FIG. 16 is an operation flowchart of the function to convert a PAD into a flowchart added to the program schema display unit 4 of FIG. 1.

FIG. 16 is a operation flowchart of the processing of the function added to the program schema display unit 4 to convert a PAD into a flowchart.

The box undergone the schema analysis is checked to determine whether or not the box includes a connective statement (step 1301) and is converted into the form conforming to the rule 73 (step 1302). The program then checks whether or not the next box exists and returns to the step 1301 if the box is found; otherwise, the processing is finished. When a box including a connective statement is missing in the step 1301, the program effects a check to determine whether or not a box including an iteration exists (step 1304). If the box exists, the box is converted into the form conforming to the rule 74 (step 1305); otherwise, the boxes are checked to determine whether or not a box indicating a judgment exists (step 1306). If the box exists, the box is converted into the form conforming to the rule 75 (step 1307); otherwise, the box is converted into the form conforming to the rule 76 of FIG. 15 (step 1308).

Figure 17:
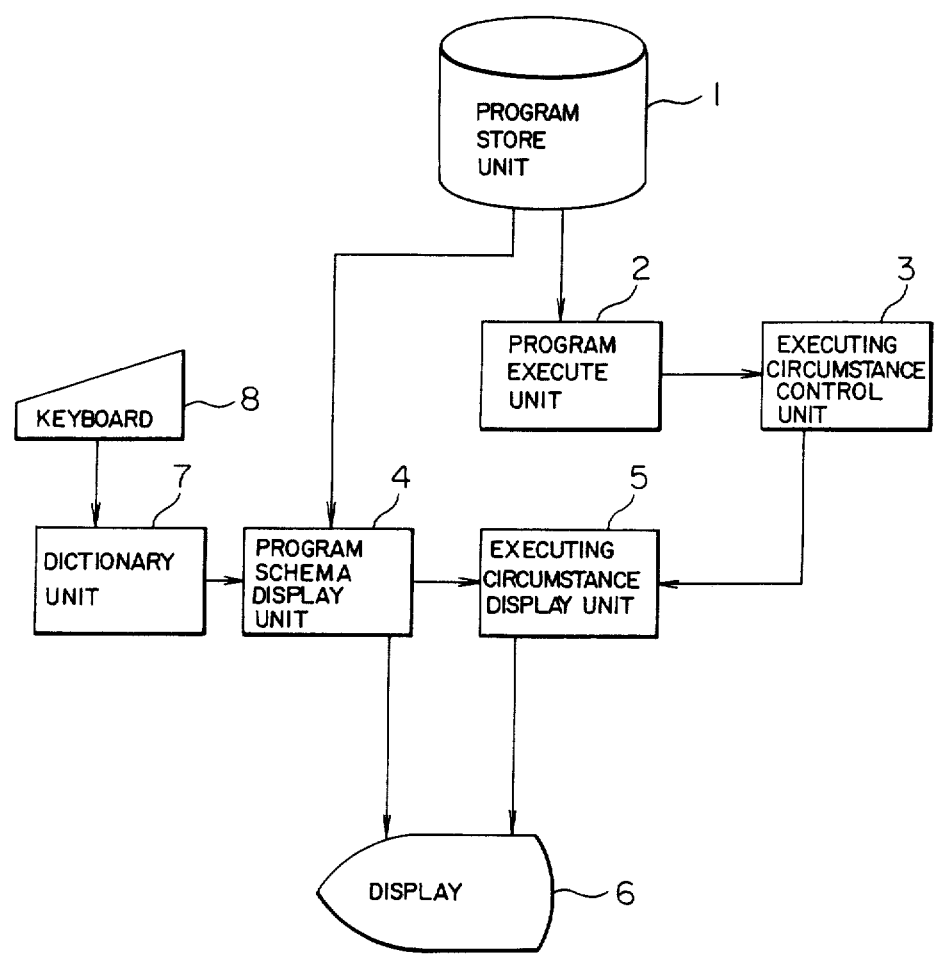
FIG. 17 is a functional structure diagram in a case where the correspondence table is implemented as a dictionary in another embodiment of the present invention.

The method above is also applicable to a case where the form other than a flowchart is used for the display. In such a case, there will be provided a conversion rule table equivalent to the display form. FIG. 17 shows a functional configuration of a case where the conversion into the display form is facilitated by disposing a dictionary generated from the conversion rules. In this diagram, the units of FIG. 1 are provided with a conversion dictionary used to convert a PAD into another graphic schema.

Figure 18:
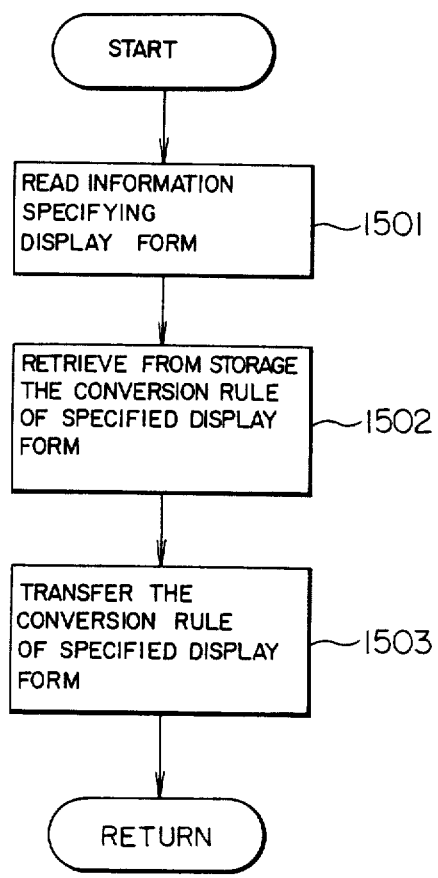
FIG. 18 is an operation flowchart showing the processing of the dictionary unit 7 of FIG. 17.

FIG. 18 is a flowchart of the processing operation of the dictionary unit 7 in FIG. 18. The subsequent description will be given with reference to FIG. 18.

First, when an information of the display form inputted from the keyboard 8 by the operator is received by the dictionary unit 7, the specified information of the display form (e.q. PAD or a flowchart) is read (step 1501), the conversion rule of the specified display form is retrieved from the storage (step 1502), and a conversion rule table of the specified conversion form is passed to the program schema display unit 4 (step 1502).

Through the processing above, the program schema of the PAD can be converted into another program schema.

As described above, according to this and other embodiments of the present invention, when executing a test on a program, the scheme of the program is displayed on the screen of the display (interactive terminal) 6 and the elements are judged to be classified as (1) after execution, (2) under execution, and (3) before execution, and the elements are displayed on the screen each time an element is executed, thereby visually displaying the test executing circumstances.

As described above, according to the present invention, when a program test is conducted in a job such as a program development, a realtime display of the path of execution of the program can be visually accomplished by use of the display, which greatly assists to understand the flow of the overall program. In addition, since the position and the execution count of each graphic element corresponding to a program element under execution are displayed and the execution counts are discriminately displayed with the different colors if necessary, an abnormality of a path can be visually and easily recognized. Consequently, the efficiency of the operation such as a program test can be improved and the number of the steps required for the program development can be reduced.

While the present invention has been described with reference to the particular illustrative embodiments, it is not restricted by those embodiment but only by the appended claims. It is to be appreciated that those skilled in the art can modify or change the embodiments without departing from the scope and spirit of the present invention.

We claim:

1. A method for displaying executing circumstances of a program comprising the steps of:
   (a) storing in store means a program constituted from a plurality of program elements;
   (b) reading the program from the store means and converting each program element thereof into a graphic element corresponding to said each program element, thereby displaying a schema of the program on a display in graphs;
   (c) executing the program;
   (d) monitoring the executing circumstances of the program; and,
   (e) classifying into a plurality of kinds of executing circumstances each program element in a path of execution of the program and displaying according to the classification of the executing circumstances the graphic elements of said program elements in a visually discriminated fashion in a realtime fashion during the program execution.

2. A method according to claim 1 wherein said program elements in said step (e) are classified into two kinds including "an element before execution" and "an element after execution".

3. A method according to claim 1 wherein said program elements in said step (e) are classified into three kinds including "an element before execution", "an element after execution", and "an element under execution".

4. A method according to claim 3 wherein said graphic elements displayed on the display in said step (e) are of a shape of boxes and are displayed by use of at least different kinds of hatching in a visually discriminated fashion.

5. A method according to claim 4 wherein said desired program is described in a high level language and said plurality of program elements are a plurality of statements of said high level language.

6. A method according to claim 1 wherein said program elements in said step (e) are classified according to the number of executions effected on the program elements.

7. A method according to claim 1 wherein said graphic elements displayed on the display in said step (e) are of a shape of boxes and are displayed by use of at least two colors in a visually discriminated fashion.

8. A method according to claim 1 wherein said graphic elements displayed on the display in said step (e) are of a shape of boxes and are displayed by use of at least one kind of hatching in a visually discriminated fashion.

9. A method according to claim 1 wherein said desired program is described in a high level language and said plurality of program elements are a plurality of statements of said high level language.

10. A method according to claim 1 wherein in said step (b), a plurality of sets of graphic elements are beforehand stored in external dictionary means and one of said sets of graphic elements is selected to be used for a conversion into graphic elements.

11. A method according to claim 10 wherein said plurality of sets of graphic elements include a set of graphic elements in the PAD form and a set of graphic elements in the flowchart form.

12. A method according to claim 1 wherein said graphic elements are displayed on the display in a form of a problem analysis diagram (PAD).

13. A method according to claim 1 wherein said each graphic elements are displayed on the display in a form of a flowchart.

14. A method for displaying executing circumstances of a program comprising the steps of:
   (a) storing in a store means a program constituted from a plurality of program elements;
   (b) reading the program from the store means and converting each program element thereof into a graphic element corresponding to said each program element, thereby displaying the schema of the program on a display in graphs;
   (c) executing the program;
   (d) counting an execution count for each program element of the program under execution; and,
   (e) according to a result of the execution count of said each program element, displaying on the display graphic elements corresponding to the program elements with different colos in a realtime fashion during the program execution.

15. A method according to claim 14 wherein in said step (d), the execution count of said each program element is divided by an execution count of all said program elements so as to normalize the execution count of said each program element.

16. A method according to claim 15 wherein said graphic elements are displayed in colors sequentially changing from a cold color to a warm color corresponding to the normalized execution counts.

17. A method according to claim 14 wherein said graphic elements are displayed in colors sequentially changing from a cold color to a warm color corresponding to values of the respective execution counts.

18. A method according to claim 14 wherein said desired program is described by use of a high level language and said plurality of program elements are a plurality of statements of said high level language.

19. A method according to claim 18 wherein said graphic elements are displayed in a PAD form on the display.

20. An apparatus for displaying executing circumstances of a program comprising:
 means for storing a program constituted from a plurality of program elements;
 means connected to said store means for reading the program from said store means and for converting each program element thereof into a graphic element corresponding to said each program element, thereby converting a schema of the program into graphics;
 display means connected to said convert means for displaying the converted graphics representing the schema of the program;
 means connected to said store means for executing the program;
 means connected to said program execute means for monitoring the executing circumstances of the program; and
 means connected to said convert means, said display means, and said monitor means for classifying into a plurality of kinds of executing circumstances each program element in a path of execution of the program and for displaying on said display means according to the classification of the executing circumstances the graphic elements corresponding to said program element in a visually discriminated fashion and in a realtime fashion during the program execution.

21. An apparatus according to claim 20 wherein said monitor means includes a table for indicating that said each program element is one of "an element before execution" or "an element after execution".

22. An apparatus according to claim 20 wherein said monitor means includes a table for indicating that said program element is one of "an element before execution", "an element after execution " or "an element under execution".

23. An apparatus according to claim 22 wherein said table further stores the execution count of each said program element.

24. An apparatus according to claim 20 wherein said monitor means includes a table storing an execution count of each said program element.

25. An apparatus according to claim 20 further comprising dictionary means connected to said convert means for selecting one of a plurality of graphic elements beforehand stored therein and for supplying the graphic elements to said convert means.

26. A method for displaying executing circumstances of a program comprising the steps of:
 (a) inputting a selected program constituted from a plurality of program elements;
 (b) converting each of the inputted program elements into a graphic element corresponding to said each program element, thereby displaying a schema of the program on a display in graphs;
 (c) executing the program;
 (d) monitoring the executing circumstances of the program; and,
 (e) classifying into a plurality of kinds of executing circumstances each program element in a path of execution of the program and displaying according to the classification of the executing circumstances the graphic elements of said program elements in a visually discriminated fashion and in a realtime fashion during the program execution.

27. A method according to claim 26, wherein said program elements in said step (e) are classified according to the number of executions effected on the program element.

28. A method according to claim 26, wherein said graphic elements displayed on the display in said step (e) are of a predetermined geometrical shape and are displayed by use of at least two colors in a visually discriminated fashion.

29. A method according to claim 26, wherein said graphic elements displayed on the display in said step (e) are of predetermined geometric shape and are displayed by use of at least one kind of hatching in a visually discriminated fashion.

30. A method according to claim 26, wherein said graphic elements displayed on the display in said step (e) are of a predetermined geometrical shape and are displayed by use of at least different kinds of hatching in a visually discriminated fashion.

31. A method according to claim 26, wherein said desired program is described in a high level language and said plurality of program elements correspond to plurality of statements of said high level language.

* * * * *

UNITED STATES PATENT AND TRADEMARK OFFICE
CERTIFICATE OF CORRECTION

PATENT NO. : 4,872,167

DATED : October 3, 1989

INVENTOR(S) : Hiroyuki Maezawa, et al.

It is certified that error appears in the above-identified patent and that said Letters Patent is hereby corrected as shown below:

On the title page:

The following inventor's name should be corrected:

Hiruyuki Maezawa should be Hiroyuki Maezawa

Signed and Sealed this

Twentieth Day of November, 1990

Attest:

HARRY F. MANBECK, JR.

*Attesting Officer*     *Commissioner of Patents and Trademarks*